March 27, 1934.  F. TOTZEK  1,952,104
COKE OVEN
Filed Oct. 15, 1930
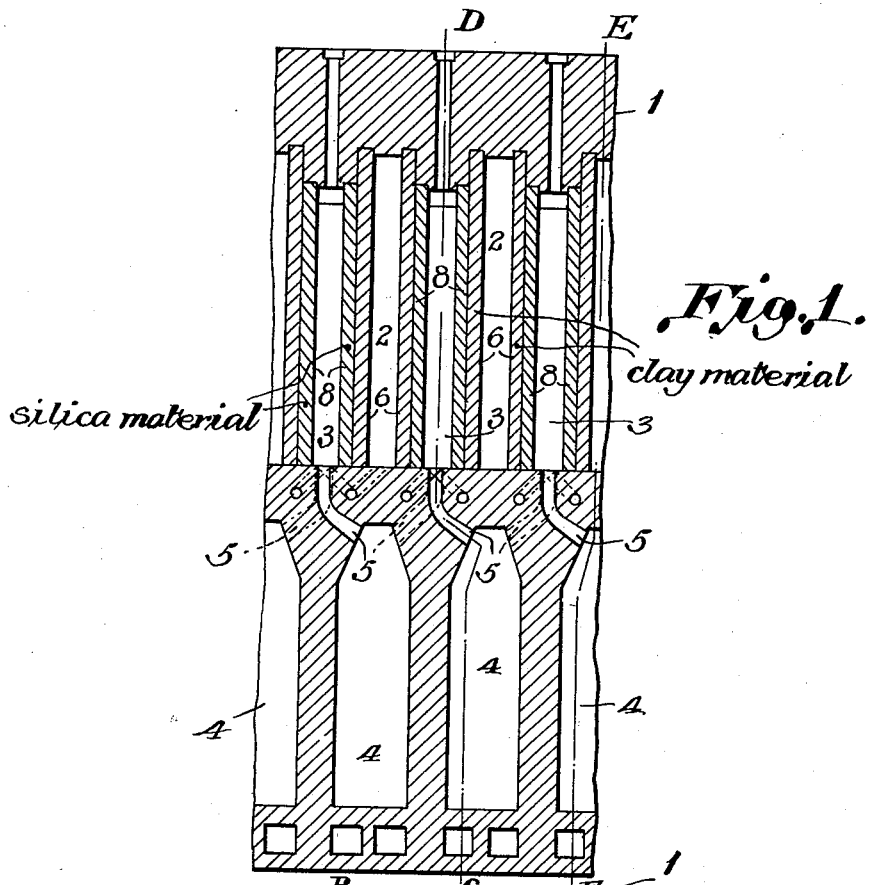
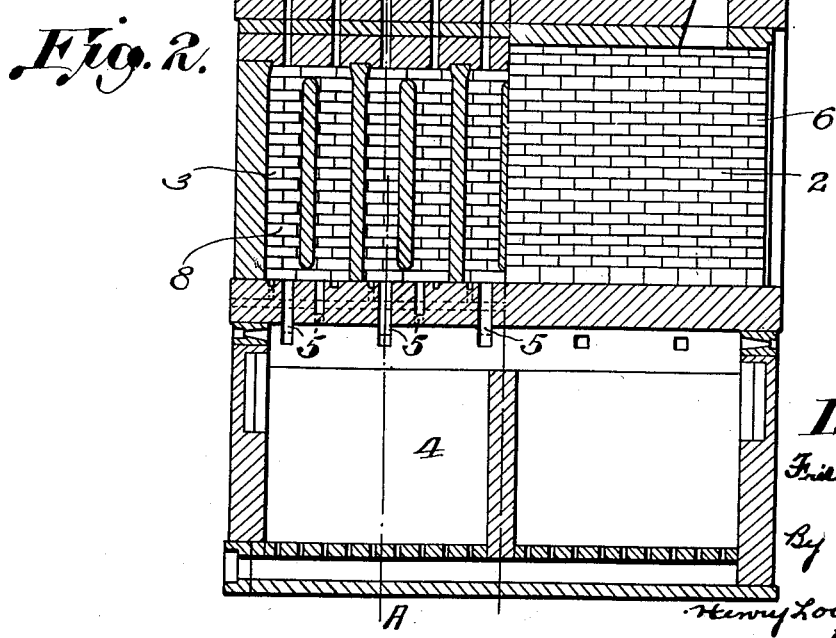
Inventor:
Friedrich Totzek
By Henry Love Clarke
his Atty Patented Mar. 27, 1934

1,952,104

UNITED STATES PATENT OFFICE 1,952,104

COKE OVEN

Friedrich Totzek, Essen-Stoppenberg, Germany, assignor, by mesne assignments, to The Koppers Company of Delaware, Pittsburgh, Pa., a corporation of Delaware Application October 15, 1930, Serial No. 488,838
In Germany November 29, 1929

1 Claim. (Cl. 202—223)

My invention relates to coke ovens, and more particularly to gas-heated ovens for the low-temperature distillation of coal and the production of half-coke (semi-coke).

It is an object of my invention to so design an oven of this type that it may be operated with gas of comparatively high temperature notwithstanding the low temperature at which the coal shall be distilled, without the use of the customary expedient of cooling the heating gas by diluting it with furnace gas or some other cooling medium, which evidently reduces the efficiency of the process.

To this end I separate the heating flues from the distillation retorts by partitions of refractory material the heat-conducting properties of which are determined in accordance with the temperature gradient from the heating gas to the retort.

The temperature of the heating gas is normally about 1,300 to 1,350° C. while the temperature in the distillation chambers or retorts is about 600 to 700° C. If walls of silica material, such as silica brick, were used, the heat conductivity of which is about 1.2 calories per square metre, hour and 1° C. temperature gradient, the temperature in the retort would be 900 to 1,000° C. In order to obtain the required low temperature in the retorts I combine with a wall of silica material a wall of fireclay of about the same thickness. The combination of silica material and fireclay is particularly useful in the present instance, because silica material has certain heat-expansion properties which render it unsuitable within the temperature range from about 600 to 1,000° C. so that silica material alone could not be used within this range.

It is understood, however, that I am not limited to the combination of separate walls of silica material and fireclay. Obviously my object may be accomplished in various other ways, for instance, by suitably selecting the thickness, composition, density, or any other properties of divided or undivided partitions, or by combining any or all of the above properties in a single partition.

In the drawing affixed to this specification and forming part thereof Fig. 1 is a vertical longitudinal cross-section through a coke oven embodying my invention. Fig. 2 is a composite section on lines C—D and E—F of Fig. 1.

Referring to the drawing, 1 is the oven wall, 2, 2 are distillation retorts, and 3, 3 are heating flues enclosing the retorts. Heating gas is supplied to the flues 3 from regenerative chambers 4 in the base of the furnace through ducts 5, 5.

By way of example, I have shown an oven in which the partitions between the heating flues 3 and the retorts 2 consist of two walls, the walls 6 adjoining the retort 2 being made, for instance, of fireclay or some other material with clay as a binder, while the walls 8 enclosing heating flues 3 are made of silica material, for instance, silica brick.

As mentioned above, silica material is not to be recommended for the temperature range of 600 to 1000° C., on account of its properties at that range, and it is particularly undesirable if the temperature is subject to variations. Above the range indicated, however, silica material is excellent.

On the other hand, fireclay or other material containing clay as a binder is suitable for the lower temperature range within which silica material should not be used, and it possesses the further advantage of being resistant to the attack of alkalis.

The walls may be built from commercial silica and fireclay bricks. As mentioned above, I do not wish to be limited to divided partitions, nor to any particular material or combination of materials, or composition of matter for the partitions.

I wish it to be understood that I do not desire to be limited to the exact details of construction shown and described, for obvious modifications will occur to a person skilled in the art.

In the claim affixed to this specification no selection of any particular modification of the invention is intended to the exclusion of other modifications thereof and the right to subsequently make claim to any modification not covered by this claim is expressly reserved.

I claim:

A coke oven adapted for relatively low temperature coking by means of external gas firing under conditions otherwise suitable for the production of high temperature coke comprising a coking chamber, heating flues on opposite sides of said coking chamber adapted for heating the same by combustion of gas in said flues, partitions separating the heating flues from the coking chamber, said partition comprising on the side adjoining the heating flues a layer of silica brick adapted for withstanding gas combustion heating for high temperature coking, and on the side adjoining the coking chamber a layer of clay brick of substantially like thickness adapted for suitable expansion at temperature required for relatively low temperature coking, and the total thickness of the combined layers being such as to produce a temperature gradient across the separating partition sufficient to insure a drop in temperature of substantially the order of from about 1300 to 1350° C. to about 600 to 700° C. and thereby maintain the requisite low temperature coking temperature within the coking chamber for production of such low temperature coke therein.

FRIEDRICH TOTZEK.